United States Patent
Ajima et al.

(10) Patent No.: US 8,504,731 B2
(45) Date of Patent: Aug. 6, 2013

(54) NETWORK FOR INTERCONNECTING COMPUTERS

(75) Inventors: Yuichiro Ajima, Kawasaki (JP); Tomohiro Inoue, Kawasaki (JP); Shinya Hiramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 12/942,291

(22) Filed: Nov. 9, 2010

(65) Prior Publication Data

US 2011/0055428 A1   Mar. 3, 2011

Related U.S. Application Data

(63) Continuation of application No. PCT/JP2008/001220, filed on May 15, 2008.

(51) Int. Cl.
*G06F 15/16* (2006.01)

(52) U.S. Cl.
USPC .......................................................... 709/250

(58) Field of Classification Search
USPC .......................................................... 709/250
See application file for complete search history.

(56) References Cited

U.S. PATENT DOCUMENTS

| | | | | |
|---|---|---|---|---|
| 4,253,144 A | * | 2/1981 | Bellamy et al. | 709/226 |
| 5,436,624 A | * | 7/1995 | Pearce et al. | 340/3.9 |
| 5,598,408 A | * | 1/1997 | Nickolls et al. | 370/351 |
| 5,797,035 A | * | 8/1998 | Birrittella et al. | 710/35 |
| 5,826,049 A | * | 10/1998 | Ogata et al. | 710/317 |
| 6,301,623 B1 | * | 10/2001 | Simpson et al. | 709/253 |
| 6,598,145 B1 | * | 7/2003 | Dally et al. | 712/1 |
| 6,853,635 B1 | * | 2/2005 | Beshai | 370/351 |
| 7,444,422 B1 | * | 10/2008 | Li | 709/238 |
| 7,724,739 B2 | * | 5/2010 | Lo et al. | 370/390 |
| 7,831,709 B1 | * | 11/2010 | Ham et al. | 709/224 |
| 8,279,867 B2 | * | 10/2012 | Carley | 370/390 |
| 2001/0048668 A1 | * | 12/2001 | Sakai | 370/254 |
| 2003/0041152 A1 | * | 2/2003 | Schmeltzle et al. | 709/229 |
| 2003/0145041 A1 | * | 7/2003 | Dunham et al. | 709/203 |
| 2004/0205110 A1 | * | 10/2004 | Hinshaw | 709/201 |
| 2005/0132163 A1 | | 6/2005 | Stockmeyer | |
| 2007/0162612 A1 | * | 7/2007 | Paggen | 709/238 |
| 2007/0280251 A1 | * | 12/2007 | Wang et al. | 370/395.1 |
| 2008/0089329 A1 | | 4/2008 | Ajima | |

FOREIGN PATENT DOCUMENTS

| | | |
|---|---|---|
| JP | 6-266684 | 9/1994 |
| JP | 3532574 | 3/2004 |
| JP | 2005-157653 | 6/2005 |
| JP | 2005-174289 | 6/2005 |
| JP | 2008-97528 | 4/2008 |
| WO | 96/32681 | 10/1996 |

OTHER PUBLICATIONS

P.A. Boylea et al., "The QCDOC supercomputer: hardware, software, and performance", 2003, printed from phys.columbia.edu/~cqft/qcdoc/qcdoc.htm.
International Search Report for PCT/JP2008/001220, mailed Jun. 10, 2008.

* cited by examiner

*Primary Examiner* — Brian P Whipple
(74) *Attorney, Agent, or Firm* — Staas & Halsey LLP

(57) ABSTRACT

In a parallel computer system including a plurality of processors, processors are classified into a plurality of groups including a prescribed number of processors, and processors are connected to each other in a complete connecting manner in the groups. Those groups are connected to each other as the respective processors are connected in linear to each other.

13 Claims, 5 Drawing Sheets

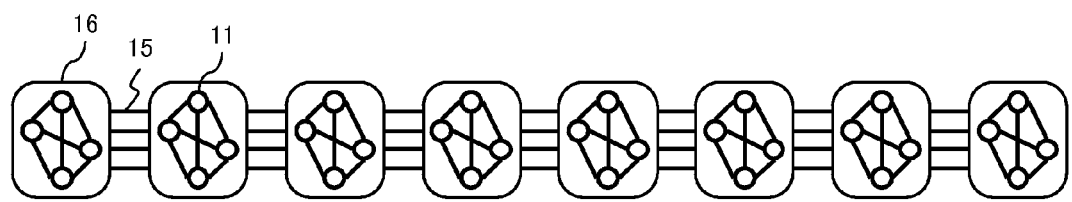
F I G. 2

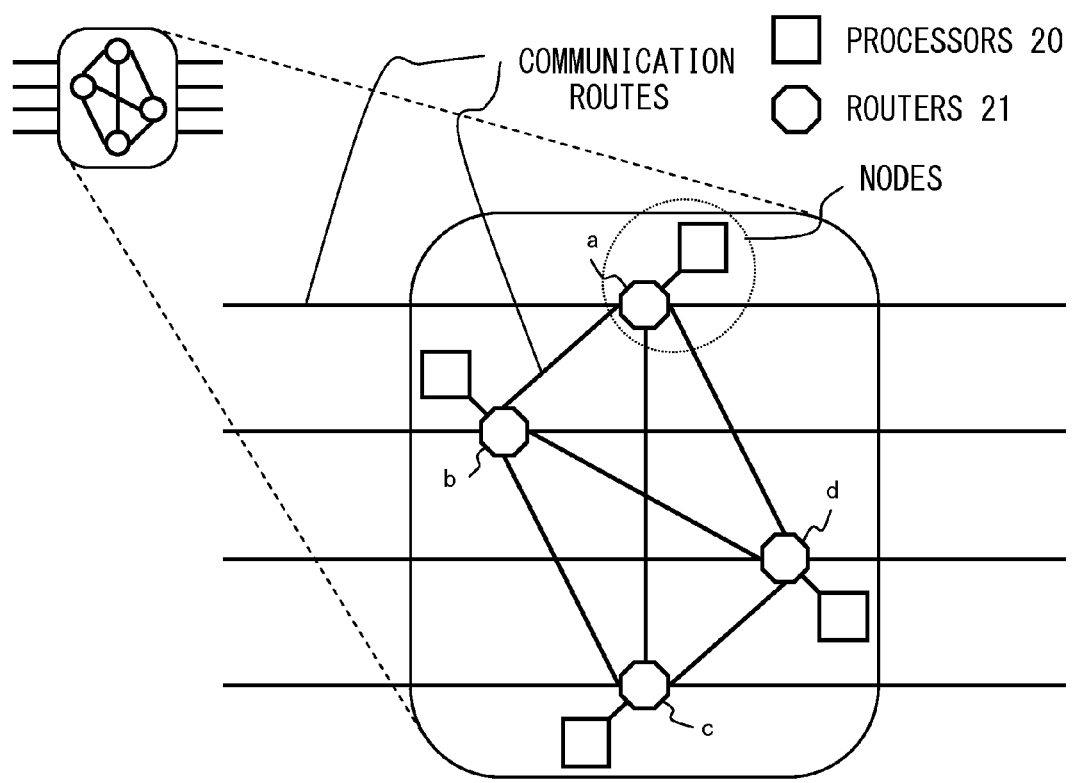
F I G. 3

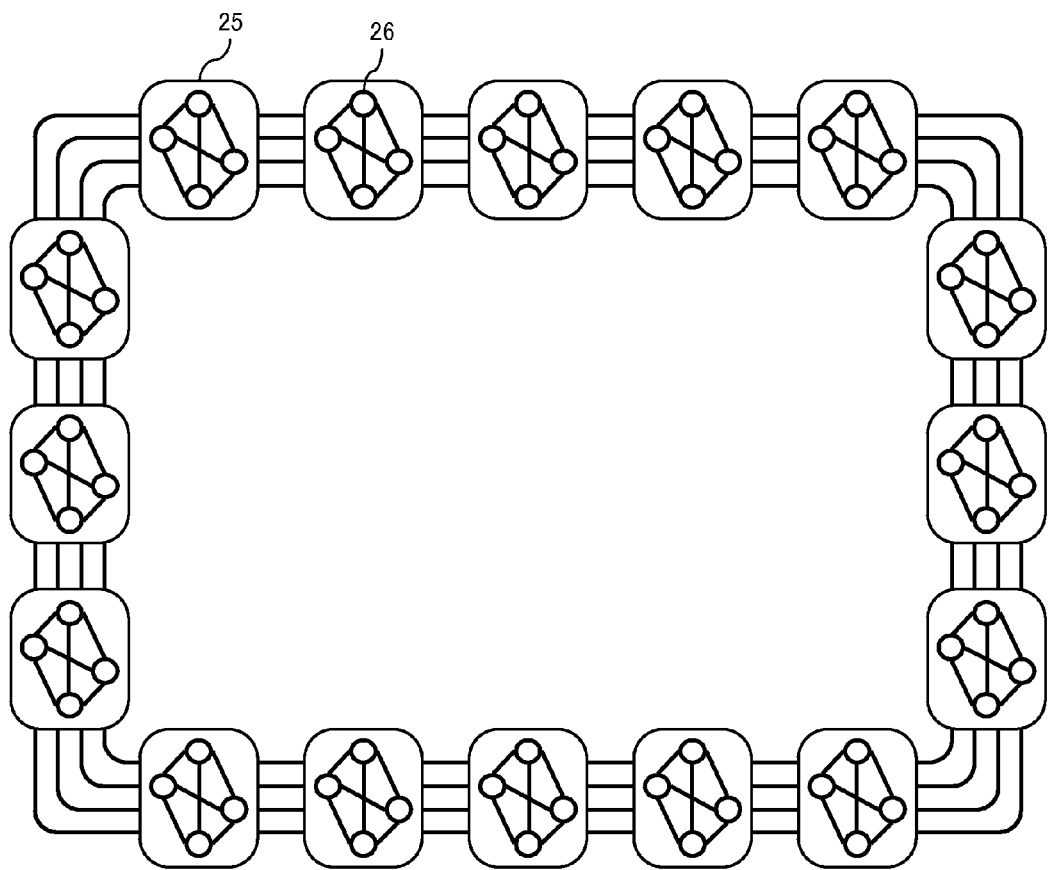
F I G. 4

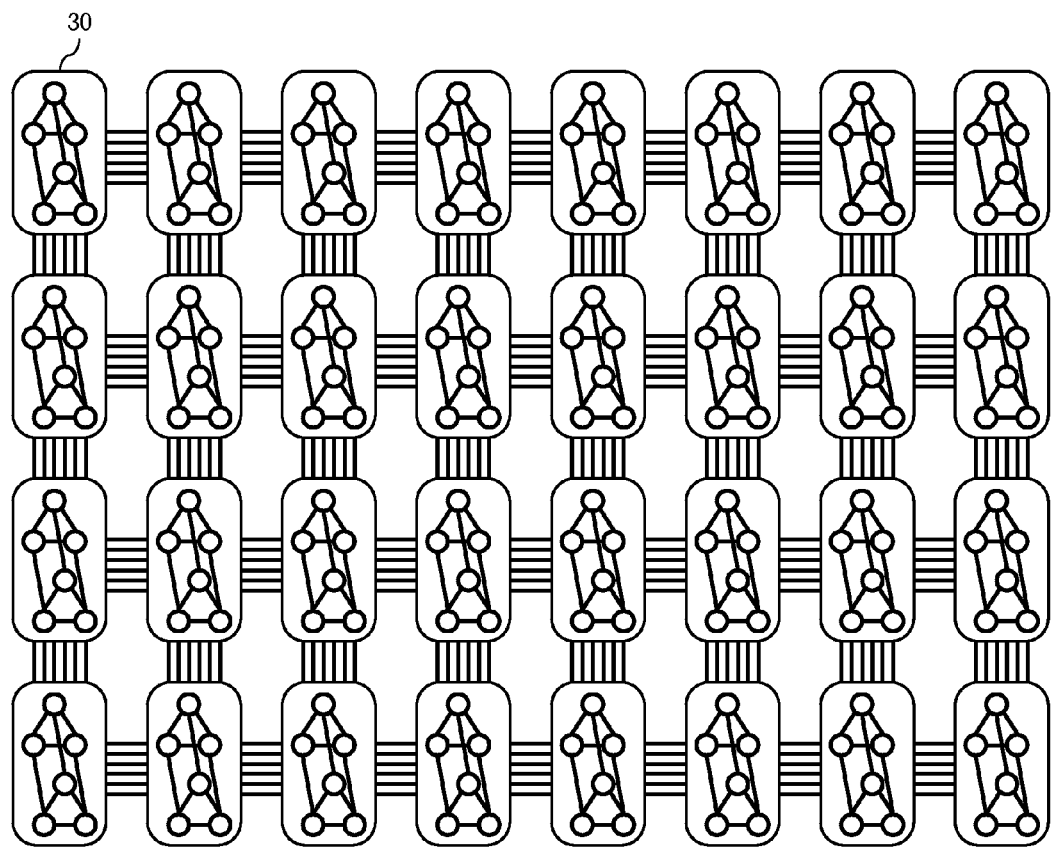
F I G. 5

NETWORK FOR INTERCONNECTING COMPUTERS

CROSS-REFERENCE TO RELATED APPLICATION

This application is a continuation application of International PCT Application No. PCT/JP2008/001220 which was filed on May 15, 2008.

FIELD

The embodiments discussed herein are related to a network that interconnects computer systems or computers.

BACKGROUND

Parallel computers include many components, and thus fail highly frequently. Accordingly, it is necessary to be able to operate a parallel computer without replacing a node that has failed so as to reduce the maintenance time consumed to replace the node that has failed. In order to meet this requirement in a multidimensional torus connection network, it is necessary to perform communications using routes not involving a node that has failed. However, having irregularity in the ways of using communication routes, wherein communications are performed through alternative routes when a failure has occurred, requires provision of an additional virtual channel to avoid deadlock. Also, this use increases the load on receiving processes because packets arrive in a mixed-up order. In other words, when alternative routes are formed adaptively for transmitting packets, a packet and its subsequent packet are sometimes transmitted through different routes, which have different traffic levels, and one of those packets may be delayed in transfer. This causes the receiver side to receive packets in a mixed-up order and to be required to perform a process of rearranging those packets into the right order. This increases the load on the receiving process.

In Patent Document 1 many virtual channels are used, and communications routes for each channel are statically determined, including alternative routes, and thereby failures are avoided promptly while attaining a deadlock-free condition.

It is known that connecting nodes for parallel computers not in linear but in a ring configuration, i.e., a torus, increases communications speed for parallel computing. Especially in remote communications algorithms, the performance of a torus becomes twice that of a mesh of the same size. In other words, the communication that takes the longest time in a torus is a communication from one node to another node that is half the length of the whole ring away, making the communications length ½ of the whole circle because one end and another end are connected, while a communication route from one end to another end in a mesh network is the communications route that takes the longest time. Accordingly, when a parallel computer is compartmentalized, or processors are grouped and the groups are connected separately, the groups of processors have to be connected in a torus.

In Patent Document 2, a switch with six ports is used, and a compartmentalized mesh, i.e., groups in which processors are connected in a mesh configuration, are connected in a torus. The two ports are connected to both ends of the compartmentalized mesh, and the four ports connect switches in an expanded torus.

Implementation of wiring between circuit boards costs more than that within a single circuit board, and the dimensions for connecting mother boards are limited in terms of actual implementation. Thus, one circuit board is handled as a group, and dimensions are increased only in the circuit board so that parallel computation of high-dimensional data can be performed at a high speed. QCDOC is a parallel computer having this configuration, and it was co-developed by RIKEN, Japan, Columbia University, U.S., and Brookhaven National Laboratory, U.S. According to QCDOC, mother boards that each include sixty-four processors connected in a six-dimensional hypercube are connected to each other using three of the six dimensions of the a six-dimensional hypercube. In the six-dimensional space in the inter-processor connections according to QCDOC, three-dimensional distances between mother boards are long, and remaining three-dimensional distances inside the mother boards, are 2.

Adaptive determination of failure-avoiding routes causes packets to arrive in a mixed-up order and leads to an increase in delay in the receiving process. This also increases a load. With these costs comes and increase in efficiency in using the band, which reduces to the minimum number of virtual channels to be added. By contrast, static determination of failure-avoiding routes leads to a decrease in delay in the receiving process and to a reduction in load, but requires a greater number of virtual channels to be added.

In some failure-avoiding communications methods in conventional techniques, different normal communications routes are used as failure-avoiding routes. When a band is shared by a normal communications route and a failure-avoiding route, the performance is deteriorated.

Torus compartmentalization according to conventional techniques divides a ring to generate straight connections, reforms the ring as a closed ring by using switches. In such a case, routers need ports for switching. However, only one switching target port is used at a time, which deteriorates the efficiency.

FIG. 1 illustrates the expanded torus connection disclosed by Patent Document 2.

In FIG. 1, numerical symbol 10 denotes 6-port switches, and numerical symbol 11 denotes processors. A mesh compartmentalized by eight processors 11 is connected to each of the switches 10, and a torus can be closed when its size is a multiple of eight (when the number of the included processors 11 is a multiple of eight) according to a setting in each switch 10.

In Patent Document 3, a system in which a plurality of buffers are provided in a node in an N-dimensional network for performing communications is disclosed.

Patent Document 1: Japanese Laid-open Patent Publication No. 6-266684
Patent Document 2: Japanese Laid-open Patent Publication No. 2005-174289
Patent Document 3: Japanese Patent No. 3532574
Non Patent Document 1: "The QCDOC supercomputer: hardware, software, and performance", P. A. Boylea, b, C. Junga, c, and T. Wettigd, CHEP03, La Jolla, Calif., Mar. 24-28, 2003, phys.columbia.edu/~cqft/

SUMMARY

The present invention relates to a network that interconnects processors in a parallel computer in which routers connected to processors are connected to each other, in which each of the routers includes a first port for a line for connecting, in a complete connecting manner, processors belonging to the same group from among groups obtained by grouping all processors included in the parallel computer into a prescribed number of processor groups, and a second port for a line for linear connecting processors belonging to different groups.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 2 illustrates a computer system according to a first embodiment;

FIG. 3 illustrates connections inside a processor group in which processors are completely connected;

FIG. 4 illustrates an entire configuration of a computer system according to a second embodiment; and FIG. 5 illustrates an entire configuration of a computer system according to a third embodiment.

DESCRIPTION OF EMBODIMENTS

Figure 1:
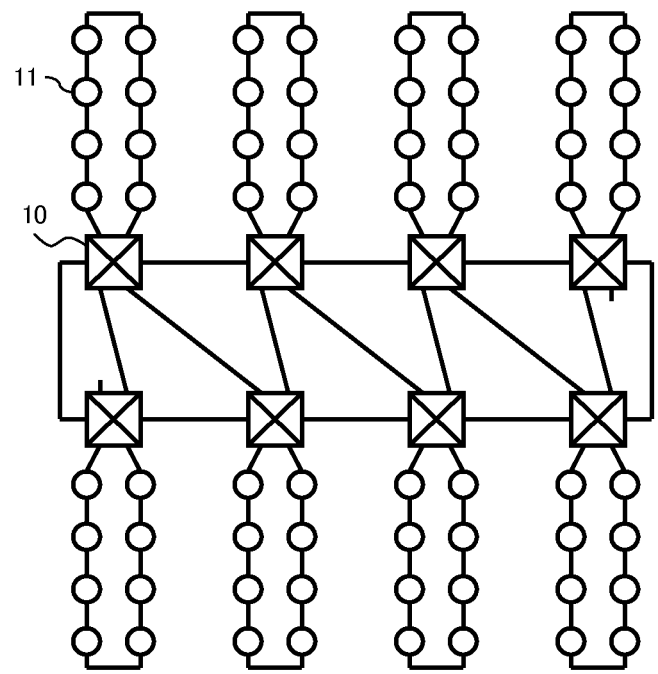
FIG. 1 illustrates an expanded torus connection.

FIG. 2 illustrates a configuration of a parallel computer system according to the first embodiment of the present invention.

In a parallel computer system according to the present embodiment, communications routes 15 and processor groups 16 are used to connect a total of M×N processors 11 using N+1 ports for processor-node communications. Linear connections 15 are ports for communications between two nodes, and one of the processors included in each group 16 is connected in linear for M groups. The processor groups 16 connect N processors 11 to each other in a complete connecting manner in all combinations. Each port is provided with two virtual channels. M represents the number of the groups 16, the groups 16 each having N processors connected in a complete connecting manner to constitute a parallel computer. Additionally, the coordinates of the processors are expressed in two dimensions, i.e., the positions of linear connections and the positions of complete connecting. Complete connecting refers to a connecting form by which all nodes in a group are connected in a one-to-one manner. A node is a set including processors and a router for connecting the processor to a network.

FIG. 3 illustrates connections of a network inside the processor group 16 in which N processors are completely connected. In the example of FIG. 3, N=4.

Each processor 20 included in the processor groups 16 is connected to a router 21, and these routers 21 are connected to the network. In FIG. 3, a combination between the processor 20 and the router 21 is referred to as a "node". In FIG. 3, the routers 21 provided in one processor group are completely connected. In other words, routers a, b, c, and d are all connected to each other in a one-to-one manner. Also, a communications route to the outside of the group is connected to each router 21. In the case of FIG. 3, a connection to a node outside of a group is realized by a communications route that connects groups in linear. Communications routes are provided from respective routers a, b, c, and d in the processor groups to the viewer's left and right sides. In the processor groups located at the ends of the linear connection, switches are provided at the ends of communication routes in order to turn back communications.

Additionally, a configuration of each node in FIG. 3 is common over all the embodiments.

FIG. 4 illustrates an entire configuration of a computer system according to the second embodiment.

In the computer system illustrated in FIG. 4, 16 completely-connected groups 25 are grouped, and those completely-connected groups 25 are connected in a one-dimensional torus. In other words, the computer system illustrated in FIG. 4 employs a configuration where connections are implemented in a one-dimensional torus connection and a one-dimensional complete connecting, i.e., in a total of two dimensions. In this configuration, there are sixteen completely-connected groups 25 in a torus connection and four nodes 26 that are included in the completely-connected groups, and thus the computer system illustrated in FIG. 4 includes sixty-four nodes in total. The number of interconnection ports of the router 21 is five in total, i.e., two for torus connections, connecting to both sides of the router 21, and three for complete connecting, being completely connected to the other three nodes.

In the computer system illustrated in FIG. 4, compartmentalization is performed in units of completely-connected groups, and each compartment has a one-dimensional torus embedding property. A one-dimensional torus embedding property means that a route passing through all the nodes constituting a computer system can be traced in a unicursal manner. When complete connecting in each group is two-dimensional or higher, a one-dimensional torus embedding property means that a route passing through all nodes can be traced in a unicursal manner with respect to connections in the respective-dimensional directions. The fact that routes can be traced in a unicursal manner means that for any communications, there is a route that passes through all nodes, and accordingly failure avoiding routes can be configured in a static manner beforehand. In the present embodiment, failure avoiding routes can be configured with at most three nodes in a failure state in each compartment, and a one-dimensional torus embedding property is maintained with at most two nodes in a failure state. In other words, when three nodes have failed in one compartment, the communication is turned back from that compartment, and can use an alternative route, so that failure avoiding routes can be found. Also, the entire system is in a one-dimensional torus with at most two failures in one compartment, and an embedding property of a one-dimensional torus is maintained because there remains one node that operates normally in that compartment.

FIG. 5 illustrates an entire configuration of a computer system according to the third embodiment.

The computer system illustrated in FIG. 5 includes thirty-two completely-connected groups 30 in total. Each of the completely-connected groups 30 includes six nodes. Those six nodes included in each completely-connected group 30 are classified into two sets, each including three nodes. The three nodes constituting one set are completely connected to each other. The nodes constituting a set of a complete connecting are connected to one of the nodes that constitute the other set. In other words, the completely-connected groups 30 in FIG. 5 realize two-dimensional complete connecting.

Now, connections of nodes in the completely-connected groups 30 are explained. When nodes are expressed by n (i, j), where i and j are natural numbers, the respective nodes are connected when j is fixed and i is changed. Next, the respective nodes are connected when i is fixed and j is changed. In this situation, the connections between the completely-connected groups 30 in FIG. 5 are two dimensional. In the case of FIG. 5, i={1, 2, 3} and j={1,2}.

Also, in the computer system illustrated in FIG. 5, each completely-connected group 30 is connected in a two-dimensional mesh. "Two-dimensional mesh" herein represents a state where the completely-connected groups 30 constituting the computer system in FIG. 5 are arranged in two dimension, i.e., in the longitudinal and crosswise directions in the figure. This means nodes can be expressed by n (i, j, k, l) by adding indices k and l, which represent mesh connections.

As described above, the computer system illustrated in FIG. 5 connects its nodes in four dimensions, i.e., in two-dimensional mesh connections and two-dimensional complete connecting. In this configuration, the number of elements in the completely-connected groups that are connected in linear in the crosswise direction in the figure is eight, and the number of elements in the completely-connected group that are connected in linear in the longitudinal direction is four. Also, in each completely-connected group, the number of elements of the completely-connected node is three, and the number of elements in the other dimensions is two. In other words, the computer system illustrated in FIG. 5 includes 192 nodes in total.

As described above, the dimension of the connections of a network indicates at least how many indices for expressing the location of the node are required when the dimension expresses a node. Accordingly, in the above embodiment, only the one-dimensional case and the two-dimensional case are described, and a network can be configured with combinations of connections in arbitrary dimensions by increasing the number of indices.

In FIG. 5, each router includes a total of seven interconnection ports, i.e., four for mesh (two for each dimension) and three for complete connecting (two for three completely-connected nodes, and one for connecting sets of completely-connected nodes).

In the computer system in FIG. 5, compartmentalization is performed in units of completely-connected groups, and each compartment has a two-dimensional torus embedding property. A two-dimensional torus embedding property means that connection routes for nodes can be projected onto one two-dimensional torus. In other words, in a complete connecting configuration, nodes are two-dimensionally and completely connected, and thus data can arrive at any node using two-dimensional connections, and accordingly a two-dimensional torus can be embedded.

Additionally, arbitrary combinations can be adopted between linear dimensions and complete connecting dimensions, and when the completely-connected groups constitute a compartment of 8×4, both a two-dimensional torus of 16×12 and a two-dimensional torus of 24×8 can be embedded.

The present embodiment makes it possible to perform failure-avoiding routing with up to one node that failed in each compartment. Also, a two-dimensional torus embedding property is maintained in a degenerated two-dimensional torus. When completely-connected groups constitute an 8×4 compartment, the two-dimensional torus can be maintained by degenerating the compartment into 16×11 by dividing the sixteen nodes when the compartment is 16×12, and by degenerating the compartment into 23×8 by dividing the eight nodes when the compartment is 24×8. In other words, when one node has failed, a two-dimensional torus can be maintained by removing a one-dimensional torus in order to avoid the one node that failed.

In the above embodiment, routes for packets are set beforehand and are invariable. Alternative routes are also set beforehand. The setting is stored as a routing table in each router. By statically setting routes for packets beforehand, packets are prevented from arriving at the receiving side in a mixed-up order, which is what would happen when routing is performed by determining alternative routes adaptively, and thereby the load of the packet receiving process is reduced. Also, by connecting groups of completely-connected nodes in linear, an alternative route for a case when a failure has occurred in a node can be set without setting redundant virtual channels.

It is possible to trace, in a unicursal manner, a route passing through all processors that are connected two-dimensionally, i.e., connections in linear and complete connecting. This is referred to as a one-dimensional torus embedding property, and can increase in speed similarly to a one-dimensional torus. In conventional methods, completely-connected compartments are closed in a torus, which requires switches in addition to routers. However, in the present embodiment, depending upon combinations between dimensions of linear connections and complete connecting, routers alone can provide a one-dimensional torus embedding property to each compartment.

In the present embodiment, complete connecting is utilized not only for torus compartmentalization, but also for failure-avoiding routes. This method can reduce conflicts between failure-avoiding routes and normal communications routes.

Provision of two virtual channels makes it possible to form a closed ring using linear connections and to avoid deadlock in a torus. This further increases the degrees of freedom in torus compartmentalization. Also, in the dimensions of complete connecting, a trace can move to target coordinates by a transfer to the next node, and accordingly one virtual channel can realize a deadlock-free situation. When two virtual channels are used, twice move can be achieved in the dimensions of complete connecting without causing deadlock. This configuration makes it possible to transfer packets using a route that avoids sites with failures. In other words, when a node has failed and that node has to be avoided, an alternative route can be constructed that leads to another route by using a dimension of complete connecting, enters another completely-connected compartment by using a dimension of connections in linear, and reaches the destination node by using a dimension of connections in a series of complete connecting in the completely-connected compartment that the route has currently entered.

In conventional methods, in addition to two virtual channels for avoiding deadlock in a torus, an additional virtual channel is required for failure-avoiding route, which increases hardware cost. The present embodiment makes it possible, with two virtual channels, both to avoid deadlock in a torus and establish a failure-avoiding route.

In the present embodiment, a greater number of ports are used per node for using complete connecting. However, complete connecting can be enclosed within the wiring on a circuit board, which leads to a smaller increase in the implementation cost. In other words, by making groups of complete connecting correspond to groups of processors mounted on the circuit board, complete connecting connections can be realized on a circuit board with shorter wires, and by adopting connections between groups instead of connections between circuit boards, which requires longer wires, the number of wires can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A computer system including a plurality of nodes, each of the nodes comprising:
   a plurality of first ports for connecting to all nodes except a subject node in a first specified number of nodes belonging to a same group on a one-to-one basis, where the nodes are grouped into a second specified number of groups such that each of the groups include a first specified number of nodes; and
   a plurality of second ports for connecting to corresponding nodes belonging to all neighboring groups of the second specified number of groups.

2. The computer system according to claim 1, wherein lines connected to the second ports constitute a torus whose both ends are connected.

3. The computer system according to claim 2, wherein the torus is a one-dimensional torus.

4. The computer system according to claim 2, wherein the torus is a two-dimensional torus.

5. The computer system according to claim 1, wherein each of the nodes comprises:
   a processor to perform arithmetic processing; and
   a router which includes the first ports for connecting the processor to a processor included in all nodes except a subject node in a first specified number of nodes belonging to a same group on a one-to-one basis, and the second ports for connecting the processor to corresponding nodes belonging to all neighboring groups.

6. The computer system according to claim 1,
   further comprising a plurality of circuit boards,
   wherein the processor and the router included in the first specified number of nodes belonging to a same group are all provided on the same circuit board.

7. The computer system according to claim 6, wherein each of the lines connected to the second ports connects different circuit boards.

8. The computer system according to claim 7, wherein each of the lines connected to the second ports connects different circuit boards through two virtual channels.

9. A computer system including a plurality of M*N (M and N are both integers equal to or greater than 1) nodes, each of the nodes comprising:
   a plurality of first ports for connecting to all N nodes belonging to a same group on a one-to-one basis, where the nodes are grouped into M groups such that each of the groups include N nodes; and
   a plurality of second ports for connecting to corresponding nodes belonging to all neighboring groups out of the M groups.

10. The computer system according to claim 9, wherein the number of the first ports is N−1, and the number of the second ports is two.

11. The computer system according to claim 9, wherein the number of the first ports is N−3, and the number of the second ports is four.

12. The computer system according to any one of claims 9 to 11, wherein the sum of the number of the first ports and the number of the second ports is N+1.

13. A method for controlling a computer system which includes a plurality of nodes, each of the nodes executing a method comprising:
   exchanging a packet with all nodes except a subject node in a first specified number of nodes belonging to a same group on a one-to-one basis through a plurality of first ports for connecting to the all nodes except a subject node in a first specified number of nodes belonging to a same group on a one-to-one basis, where the nodes are grouped into a second specified number of groups such that each of the groups include a first specified number of nodes, and
   exchanging a packet with corresponding nodes belonging to all neighboring groups through a plurality of second ports for connecting to the corresponding nodes belonging to all of the neighboring groups of the second specified number of groups.

* * * * *